(12) United States Patent
Rethaber (10) Patent No.: US 12,029,159 B2
(45) Date of Patent: Jul. 9, 2024

(54) CUTTER HEAD FOR A BRUSH CUTTER

(71) Applicant: Andreas Stihl AG & Co. KG, Waiblingen (DE)

(72) Inventor: Achim Rethaber, Fellbach (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 294 days.

(21) Appl. No.: 17/338,760

(22) Filed: Jun. 4, 2021

(65) Prior Publication Data
US 2021/0386014 A1    Dec. 16, 2021

(30) Foreign Application Priority Data
Jun. 15, 2020   (EP) ..................................... 20180105

(51) Int. Cl.
*A01D 34/73*    (2006.01)
*A01D 34/82*    (2006.01)

(52) U.S. Cl.
CPC ........... *A01D 34/733* (2013.01); *A01D 34/82* (2013.01)

(58) Field of Classification Search
CPC .............................. A01D 34/733; A01D 34/82
USPC ........................................... 30/276, 300, 347
See application file for complete search history.

(56) References Cited

U.S. PATENT DOCUMENTS

| | | | | |
|---|---|---|---|---|
| 4,089,114 A | * | 5/1978 | Doolittle | A01D 34/416 30/DIG. 1 |
| 4,162,575 A | * | 7/1979 | Ballas | A01D 34/4165 30/347 |
| 4,172,322 A | * | 10/1979 | Ballas | A01D 34/4165 30/276 |
| 4,205,510 A | * | 6/1980 | Raniero | A01D 34/82 56/12.9 |
| 4,300,336 A | * | 11/1981 | Miyata | A01D 34/733 30/276 |
| 4,413,468 A | * | 11/1983 | Hockersmith | A01D 34/733 56/295 |
| 5,881,540 A | * | 3/1999 | Miller | A01D 34/733 56/255 |
| 6,112,416 A | * | 9/2000 | Bridges | A01D 34/733 30/276 |
| 6,119,350 A | * | 9/2000 | Sutliff | A01D 34/736 30/276 |

(Continued)

FOREIGN PATENT DOCUMENTS

EP    2 737 788    6/2014
WO    2008/053508   5/2008

*Primary Examiner* — Sean M Michalski
(74) *Attorney, Agent, or Firm* — Gudrun E Huckett (57) ABSTRACT

A cutter head for a brush cutter has a base body with top base body part and bottom base body part. A screw element is arranged at the bottom base body part for attachment to an output shaft of the brush cutter. A receptacle for fastening a cutting tool is provided between top and bottom base body parts. The base body is rotatably driven in operation of the brush cutter about an axis of rotation of the base body. The top and bottom base body parts are held together by a detachable snap-on connection. The snap-on connection is positioned at a distance, measured in a radial direction, from the axis of rotation of the base body. The distance amounts to at most 40% of the cutter head diameter. For releasing the snap-on connection, the top and bottom base body parts are pulled apart from each other by a pulling force.

26 Claims, 8 Drawing Sheets

(56) References Cited

U.S. PATENT DOCUMENTS

| | | | |
|---|---|---|---|
| 7,000,324 B2 * | 2/2006 | Fogle | A01D 34/416 30/276 |
| 9,603,301 B2 * | 3/2017 | Jerez | A01D 34/4166 |
| 9,642,302 B2 * | 5/2017 | Jerez | A01D 34/4166 |
| 10,278,327 B2 * | 5/2019 | Skinner | A01D 34/733 |
| 10,939,614 B2 * | 3/2021 | Bringhurst | A01D 34/4166 |
| 2002/0073556 A1 * | 6/2002 | Fogle | A01D 34/416 30/276 |
| 2008/0271424 A1 * | 11/2008 | Alliss | A01D 34/4166 56/12.7 |
| 2011/0119932 A1 * | 5/2011 | Pfaltzgraff | A01D 34/4166 30/347 |
| 2019/0075721 A1 * | 3/2019 | Cholst | A01D 34/4165 |

* cited by examiner

CUTTER HEAD FOR A BRUSH CUTTER

BACKGROUND OF THE INVENTION

The invention relates to a cutter head for a brush cutter, wherein the cutter head comprises a divided base body comprising a top base body part and a bottom base body part, a screw element arranged at the bottom base body part and configured to be fastened to a drive shaft of the brush cutter, wherein between the top base body part and the bottom base body part at least one receptacle for fastening a cutting tool is provided, wherein the base body is configured to be driven in rotation about its axis of rotation in operation of the brush cutter, wherein the top base body part and the bottom base body part are held at each other by a snap-on connection.

Cutter heads for a brush cutter are known which are comprised of a base body wherein the base body is comprised of two base body parts. In operation of a brush cutter, the base body is driven in rotation about an axis of rotation. Between the base body parts, at least one cutting tool is arranged wherein, in the base body, a bearing bolt is arranged at which the cutting tool is held. For mounting the cutter head, the cutting tool is to be threaded onto the bearing bolt and subsequently the base body parts are to be fastened to the output shaft of the brush cutter. A disadvantage of such cutter heads is that the assembly is made rather difficult due to the numerous individual parts.

The invention has the object to further develop a cutter head of the aforementioned kind such that a simple assembly and disassembly of the cutter head as well as a simple attachment of the cutter head at the output shaft of the brush cutter is made possible.

SUMMARY OF THE INVENTION

In accordance with the invention, this is achieved in that the snap-on connection is positioned at a radial distance from the axis of rotation, wherein the distance is measured in a radial direction in relation to the axis of rotation and amounts to at most 40% of the diameter of the cutter head.

The cutter head according to the invention for a brush cutter comprises a divided base body. The base body comprises a top base body part and a bottom base body part. The top base body part is the base body part that is contacting with its end face, i.e., its topside, the brush cutter when the cutter head is attached to the brush cutter. The bottom base body part is the base body part that is facing the ground in normal operation of the brush cutter when the cutter head is attached to the brush cutter. A screw element is arranged at the bottom base body. The screw element serves for fastening the base body to an output shaft of the brush cutter. Between the top base body part and the bottom base body part, at least one receptacle for attachment of a cutting tool is provided. The cutting tool is axially arranged, i.e., in direction of the axis of rotation of the base body, between the top base body part and the bottom base body part. The base body can be driven in rotation about its axis of rotation in operation of a brush cutter. The top base body part and the bottom base body part are held at each other by means of a detachable snap-on connection.

The snap-on connection enables the operator of the brush cutter to connect the top base body part to the bottom base body part wherein the cutting tool is held at the receptacle. In this way, the top base body part and the bottom base body part are connected to each other and form, together with the cutting tool, a unit that can be screwed onto the output shaft of the brush cutter. Thus, the operator of the brush cutter must not individually mount the various cutter head parts on the output shaft. Also, when demounting the cutter head, an accidental falling apart of the cutter head parts is avoided because they are held together by the snap-on connection.

It is advantageously provided that the snap-on connection is positioned at a distance from the axis of rotation, wherein the distance is measured in radial direction in relation to the axis of rotation and amounts to at most 40%, in particular at most 30%, preferably at most 25%, of the diameter of the cutter head.

It is advantageously provided that the receptacle comprises a bearing axis which is extending in the direction of the axis of rotation, wherein the bearing axis is positioned at a distance from the axis of rotation and the distance between bearing axis and axis of rotation is larger than the distance between the snap-on connection and the axis of rotation. The snap-on connection is thus arranged inside the interior of the cutter head and is thus arranged in a protected position. Due to the arrangement of the snap-on connection very close to the axis of rotation, the snap-on connection does not delimit the pivot movement of the cutting tools. When a cutting tool in operation impacts on a solid obstacle, the cutting tool can pivot very far backward opposite to the rotational direction of the cutter head without coming into contact with the snap-on connection.

The snap-on connection comprises preferably at least one gripping hook and in particular at least one holding contour which is in operative connection with the gripping hook. The gripping hook is preferably arranged at the top base body part and the at least one holding contour is arranged preferably at the bottom base body part. When joining the top base body part and the bottom base body part, the gripping hook contacts the holding contour and is in this way deflected radially in relation to the axis of rotation. For this purpose, the gripping hook is preferably bendable or flexible in a direction that is radial to the axis of rotation. When the top base body part and the bottom base body part are pushed together far enough, the gripping hook of the snap-on connection engages behind the holding contour. The at least one gripping hook comprises preferably a hook head which is configured for engaging from behind the at least one holding contour. Once the snap-on connection is locked, the top base body part and the bottom base body part are held together in the direction of the axis of rotation of the cutter head. The hook head is preferably oriented outwardly, in radial direction away from the axis of rotation. In this way, the gripping hook in operation of the brush cutter is pushed by centrifugal forces against the holding contour in outward direction. Accordingly, the shape of the gripping hook or the pretension of the gripping hook against the holding contour is maintained even over an extended operating period of the cutter head.

The hook head is preferably designed such that the snap-on connection, when pushing together the top base body part and the bottom base body part, engages and locks and, when pulling apart the base body parts, disengages and unlocks. For locking the snap-on connection, the base body parts are to be pushed toward each other in the direction of the axis of rotation; for releasing the snap-on connection, the base body parts are to be pulled apart in the opposite direction. The forces which are required for locking and releasing the snap-on connection result from the geometries of the hook head as well as of the holding contour. Also, the spring action of the gripping hooks influences the locking and releasing forces of the snap-on connection. By adaptation of the geometries of the hook head and of the holding contour, the locking and releasing forces of the snap-on connection can be adapted in accordance with the demands on the cutter head. The snap-on connection comprises preferably two, in particular three or more, gripping hooks with corresponding holding contours. When a plurality of gripping hooks and holding contours are provided, they are preferably arranged at uniform angle spacings relative to each other about the axis of rotation of the cutter head.

Preferably, a disruptive contour is provided at one of the two base body parts and a guide groove, interacting with the disruptive contour and extending in the direction of the axis of rotation, is provided at the other base body part in order to align the top base body part and the bottom base body part relative to each other in circumferential direction relative to the axis of rotation by means of the disruptive contour and the guide groove. Only when the top base body part and the bottom base body part are aligned relative to each other such that the disruptive contour can engage the guide groove, joining of the base body parts and therefore locking of the snap-on connection are possible. Without alignment, joining of the base body parts is blocked by the disruptive contour. Accordingly, the snap-on connection is in particular embodied such that the snap-on connection can lock only when the top base body part and the bottom base body part are aligned with each other by means of the disruptive contour and the guide groove. It is therefore possible for the operator of the brush cutter to properly assemble the cutter head in a simple manner. Faulty assembly of the cutter head by the user is therefore prevented by means of a poka-yoke configuration.

It is advantageously provided that torque in circumferential direction can be transmitted between the top base body part and the bottom base body part by means of the disruptive contour and the guide groove. In this way, already during assembly of the cutter head the snap-on connection is protected in case of torque acting on the base body parts because torque is absorbed by means of the disruptive contour and the guide groove. The snap-on connection is not loaded by torque. Preferably, the base body comprises at least two or more than two (a plurality of) disruptive contours with corresponding guide grooves.

The receptacle for a cutting tool of the cutter head is preferably embodied as a bearing bolt. Preferably, a cutting tool can be arranged at the base body by means of the bearing bolt. The bearing bolt is designed in this context such that the cutting tool is held pivotably at the bearing bolt. The bearing bolt is preferably attached with one end at the top base body part or at the bottom base body part. In this way, in particular in relation to cutter heads whose base body parts are also screwed together by means of the bearing bolts, mounting or demounting of the base body parts can be enabled in a simple manner. For separating or joining the top base body part and the bottom base body part, only the snap-on connections are to be released or locked. The bearing bolt is preferably fastened to the top base body part.

It is advantageously provided that the screw element is fixedly arranged at the bottom base body part, i.e., cannot rotate relative to the bottom base body part. Upon attachment of the cutter head at the brush cutter, the cutter head is preferably screwed on as a pre-assembled unit by means of the screw element onto the output shaft of the brush cutter. In this context, by means of the screw element, the bottom base body part is clamped against the top base body part whereby the top base body part is supported with its end face at the brush cutter. The screw element can be an element which is embodied separate from the bottom base body part or can be a thread which is provided in the bottom base body part. In this way, it is ensured that the screw element with the bottom base body part on the output shaft can be re-tightened against the top base body part.

At the at least one receptacle of the cutter head, preferably a cutting tool is pivotably arranged. By means of the outer section of the cutting tool which is projecting from the base body of the cutter head, grass, brush or similar things can be cut.

BRIEF DESCRIPTION OF THE DRAWING

Further features of the invention result from the description and the drawing in which an embodiment of the invention, disclosed in detail in the following, is illustrated.

DESCRIPTION OF PREFERRED EMBODIMENTS

Figure 1:
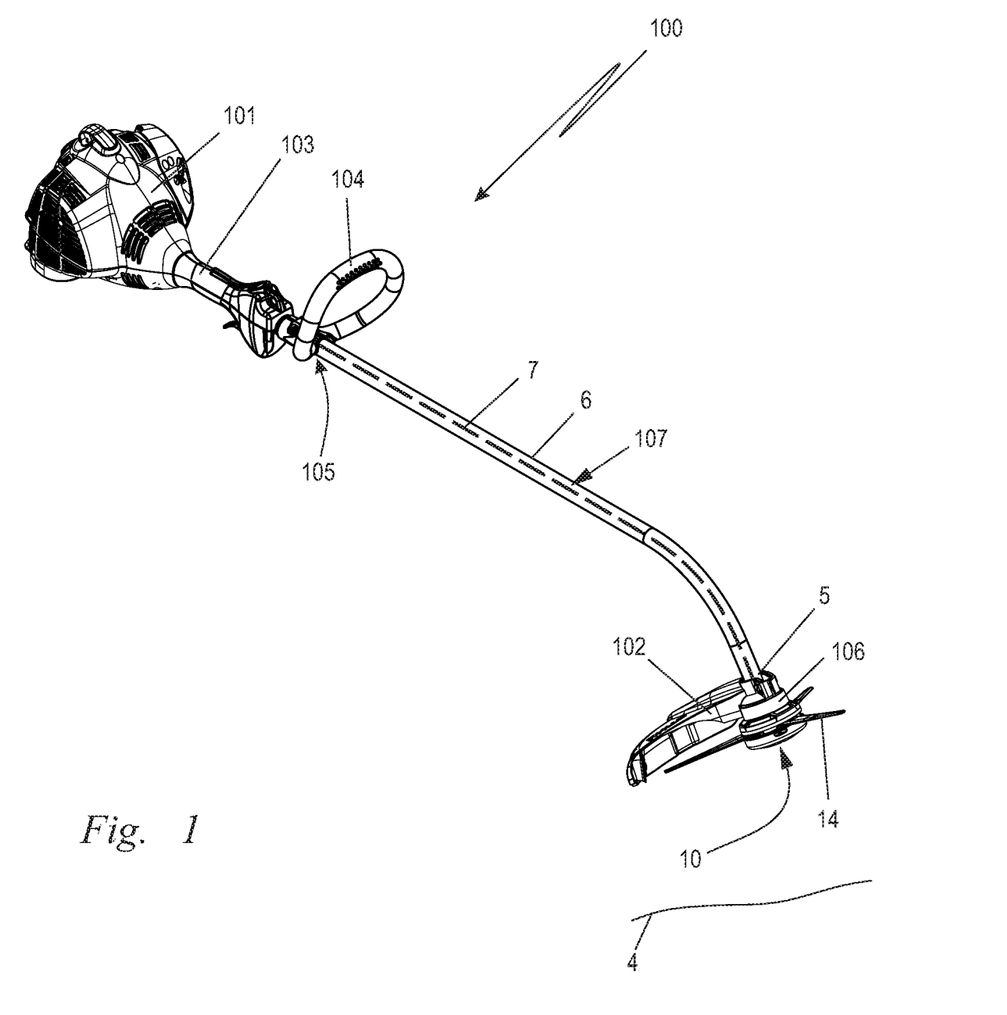
FIG. 1 shows in a schematic side view a brush cutter with a cutter head.

In FIG. 1, a power tool 100 configured as a brush cutter is shown in a perspective side view. A cutter head 100 is provided at a first bottom end 5 of a guide tube 6 that is provided at its second top end 105 with a drive motor 101 secured thereat. The drive motor 101 drives a connecting shaft 107 that is advantageously embodied as a flexible shaft 7 and follows the curvature of the guide tube 6. In the region of the top end section of the guide tube 6, an operating grip 103 is provided which is penetrated by the guide tube 6. Adjacent to the operating grip 103, a round grip 104 is secured at the guide tube 6.

Due to the curvature of the guide tube 6, the work position of the cutter head 10 relative to the ground is determined without a bevel gear being required. Alternatively, the cutter head 10 can also be driven by a bevel gear. The cutter head 10 is expediently arranged as close as possible to the end 5 of the guide tube 6 and advantageously provided with a wrapping protection 106 so that grass is prevented from wrapping around the drive train. A different arrangement of the drive motor 101, in particular at the bottom end 105 of the guide tube 6, can be expedient.

Figure 2:
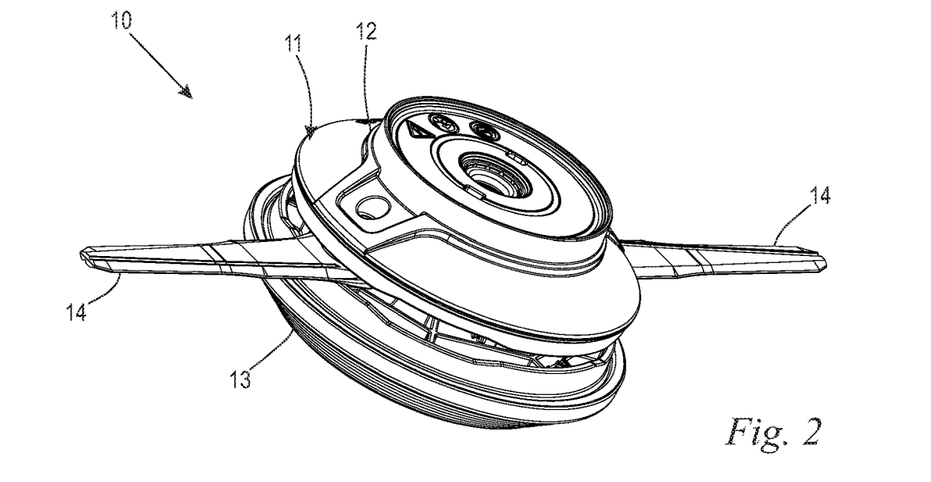
FIG. 2 shows in a perspective illustration the cutter head according to the invention with cutting tool.
Figure 3:
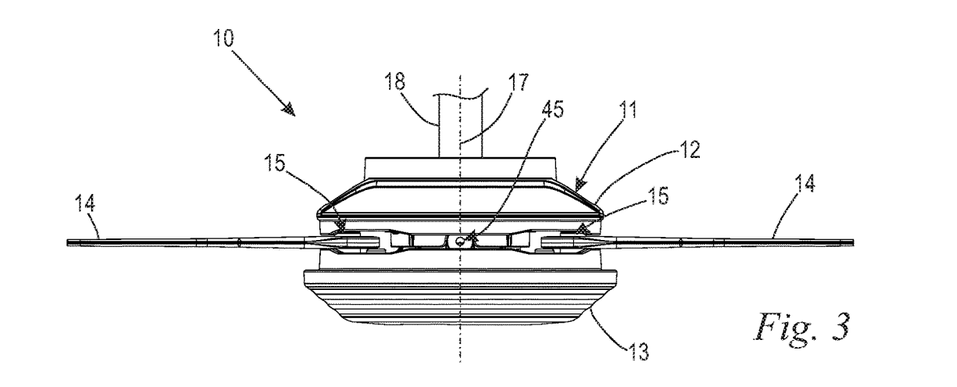
FIG. 3 is a side view of the cutter head according to FIG. 2.
Figure 4:
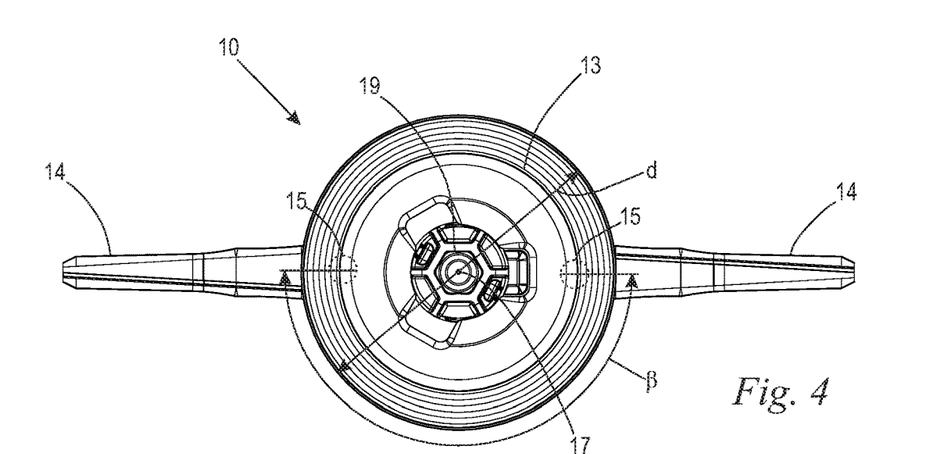
FIG. 4 shows in a view from below the cutter head according to FIG. 2.

As illustrated in FIGS. 2 to 4, the cutter head 10 comprises a base body 11 which is formed of a top base body part 12 and a bottom base body part 13. When the cutter head 10 is fastened to the power tool 100, the cutter head 10 is resting with the top base body part 12 against the power tool 100. The bottom base body part 13 in the usual operating position of the power tool 100 is facing the ground 4. Between the top base body part 12 and the bottom base body part 13 at least one cutting tool 14 is secured. For attachment of the cutter head 10 at an output shaft 18 of the power tool 100, a screw element 19 (FIG. 4) is arranged at the base body 11. The cutter head 10, in particular the base body 11, is driven in rotation in operation of the power tool 100 about an axis of rotation 17.

As illustrated in FIGS. 2 to 4, the cutter head 10 comprises in the embodiment two cutting tools 14 which are respectively secured at a receptacle 15. The cutting tools 14 are embodied as cutting knives in the preferred embodiment. The cutter head 10 comprises preferably further receptacles 45 that serve for attachment of trimmer line. Thus, the cutter head 10 can be operated with cutting knives and/or with trimmer line. The receptacles 15 are designed as bearing bolts 16 (FIG. 6) whereby a cutting tool 14 is pivotably secured at its bearing bolt 16 about its bearing axis 32. The bearing axis 32 of the bearing bolts 16 extends parallel to the axis of rotation 17. In an alternative embodiment of the cutter head 10, it is also possible that three or more cutting tools 14 are provided. In order to avoid imbalance of the cutter head 10, the receptacles 15 for the cutting tools 14 are distributed at a uniform angle spacing β about the axis of rotation 17 of the cutter head 10. Thus, the angle spacing β between the bearing axes 32 of the neighboring receptacles 15 is preferably constant. Thus, the angle distance β is 180° in the present embodiment of the cutter head with two receptacles 15 (FIG. 4).

Figure 6:
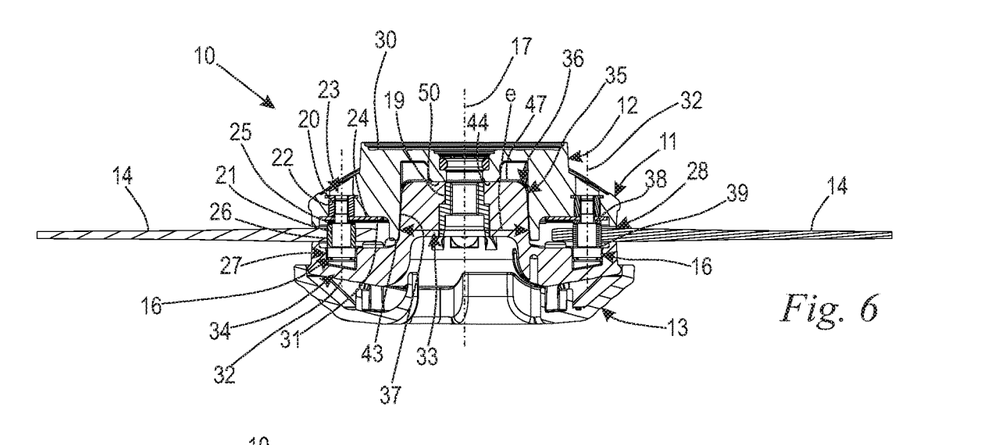
FIG. 6 is a section illustration of the cutter head viewed in the direction of the arrows VI according to FIG. 5.

As illustrated in FIGS. 4 and 6, the screw element 19 is arranged at the bottom base body part 13. In the embodiment, the screw element 19 is designed as a nut. In the embodiment, the screw element 19 is arranged in the bottom base body part 13. The screw element 19 is embodied as a hexagon and is received in a corresponding counter contour of the bottom base body part 13 so that it is secured by form fit against rotation in relation to the base body part 13. Due to the inertia of the bottom base body part 13, re-tightening of the screw element 19 is ensured in operation of the cutter head 10. In the embodiment, the screw element 19 is made of a metal material. The bottom base body part 13 is comprised instead of a plastic material. In the embodiment, the screw element 19 is pressed into the bottom base body part 13 but can also be molded around with plastic material in an alternative attachment of the screw element 19 at the bottom base body part 13. In an alternative embodiment of the cutter head 10, it can be expedient to configure the screw element 19 as a captive nut which is rotatable relative to the bottom base body part. When attaching the cutter head 10, the cutter head 10 is screwed by means of the screw element 19 onto the output shaft 18 which is schematically illustrated in FIG. 3.

Figure 5:
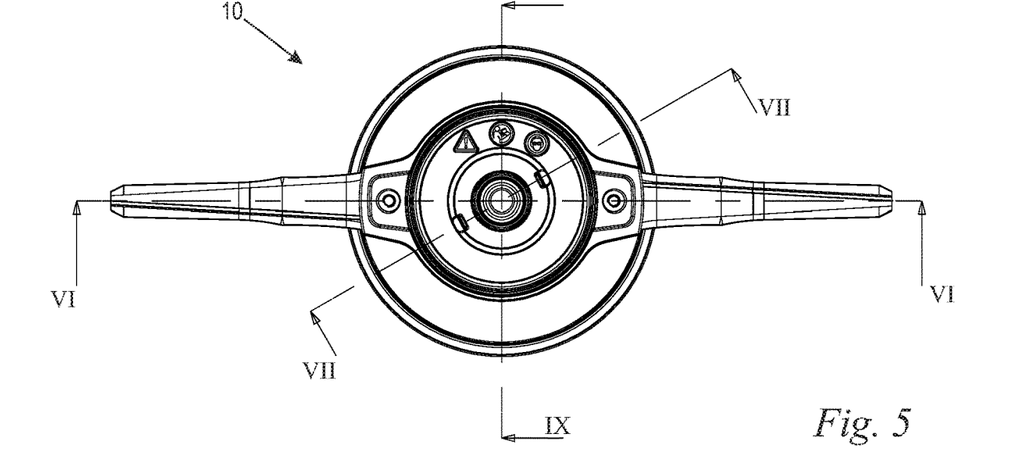
FIG. 5 shows in a plan view the cutter head according to FIG. 2.

In FIG. 5, the cutter head 10 is illustrated in a top plan view in order to indicate the various section illustrations.

The illustration according to FIG. 6 shows a section view of the cutter head 10 with cutting tool 14, taken through the receptacles 15 embodied as bearing bolts 16. In the preferred embodiment of the cutter head 10, the bearing bolts 16 are fastened to the top base body part 12. In an alternative embodiment, it can be expedient to fasten the bearing bolts 16 to the bottom base body part 13. The bearing bolts 16 are fastened with one end either to the top base body part 12 or to the bottom base body part 13. The bearing bolt 16 comprises a threaded section 20 and a holding section 21. The bearing bolt 16 is screwed with its threaded section 20 into a securing thread 22 provided at the top base body part 12. In the embodiment, the securing thread 22 is formed by a nut which is embedded in plastic material in the top base body part 12. As an alternative, the securing thread 22 can be pressed into the top base body part 12. In the embodiment, the securing thread 22 is knurled at the circumference for better force transmission. The top base body part 12 comprises an opening 23 that extends approximately coaxially to the bearing axis 32 of the bearing bolt 16 to the top side 30 of the top base body part 12 that is facing the power tool 100. The opening 23 serves for avoiding material accumulation when molding around the securing thread 22 and prevents that plastic material can penetrate into the inner thread of the securing thread 22. The bearing bolt 16 is screwed into the securing thread 22 via the bottom side 31 of the top base body part 12 facing away from the top side 30. The top base body part 12 and the bottom base body part 13 are not held together axially by the bearing bolt 16. Pulling apart the two base body parts 12, 13 requires no change at the bearing bolt 16.

An independent concept according to the invention of the present cutter head 10 resides in that, as illustrated in FIG. 6, a support plate 24 comprised of metal is provided which is fastened to the bottom side 31 of the top base body part 12 which is facing the bottom base body part 13. The support plate 24 in the embodiment is of a one-piece configuration and comprises a main opening for partial passage of the bottom base body part 13. The support plate 24 comprises additionally for each bearing bolt 16 a further opening through which the respective bearing bolt 16 extends. The support plate 24 serves for supporting the bearing bolt 16 against the top base body part 12. Between a first shaft shoulder 38 of the bearing bolt 16 and the support plate 24, a support ring 25 is provided. When tightening the bearing bolt 16 by means of the securing thread 22, the bearing bolt 16 is clamped by means of the first shaft shoulder 38 and the support ring 25 against the support plate 24. Due to the support plate 24, the forces are introduced into the top base body part 12. Due to the configuration of the support plate 24 of metal, high support forces can be ensured. Since all bearing bolts 16 are supported at the same support plate 24, a portion of the forces which occur during operation can mutually compensate each other. In this way, the top base body part 12 is relieved.

As illustrated in FIG. 6, at the holding section 21 of the bearing bolt 16 a bearing sleeve 26 is provided at which the cutting tool 14 is held. The cutting tool 14 is thus pivotable about the bearing axis 32 of the bearing bolt 16. The bearing axis 32 of the bearing bolt 16 extends parallel to the axis of rotation 17 of the cutter head 10. The bearing sleeve 26 is arranged so as to float between the support ring 25 and a second shaft shoulder 39 of the bearing bolt 16. The bearing sleeve 26 is preferably oiled and formed of sinter metal so that the friction forces between cutting tool 14 and bearing bolt 16 are reduced. The heat, produced between the bearing sleeve 26 and the cutting tool 14 upon pivoting, is transmitted through the support plate 24 into the top base body part 12.

The cutting tool 14 is pivotably supported at one end thereof in a pivot gap 28 of the cutter head 10 at the bearing sleeve 26 and projects with the other end out of the pivot gap 28. The pivot gap 28 is delimited by the bottom side 31 of the top base body part 12 and by the top side 43 of the bottom base body part 13 facing the bottom side 31. When the cutter head 10 is mounted, the bearing bolt 16 extends across the entire height of the pivot gap 28 in the direction of the axis of rotation 17 and projects into a bolt opening 27 of the bottom base body part 13. The bearing bolts 16, immersed into the bolt openings 27, are also supported by the bottom base body part 13.

As illustrated in FIG. 6, the top base body part 12 comprises a through opening 46 extending coaxially to the axis of rotation 17 for passing through the output shaft 18. In the embodiment of the cutter head 10, no form fit between the output shaft 18 and the top base body part 12 is provided. In an alternative embodiment, a form fit between the output shaft 18 and the top base body part 12 can be provided however. In such an embodiment, the snap-on connection 1, however, is to be embodied rotatably at the holding contour 4 in order to be able to rotate the bottom base body part 13 on the output shaft 18. When only the screw element 19 is rotatably embodied relative to the bottom base body part 13, a rotatable snap-on connection 1 can be dispensed with.

The bottom base body part 13 is divided into an interior region 33 and an exterior region 34 in radial direction relative to the axis of rotation 17. The interior region 33 of the bottom base body part 13 is designed as a securing sleeve 35 which extends into a central opening 36 of the top base body part 12. The central opening 36 is in particular of a cup-shaped configuration and extends about the through opening 46. In the mounted state of the cutter head 10, the securing sleeve 35 with its end face 47 facing the bottom side 31 of the top base body part 12 is contacting the top base body part 12 at the end face 50 of the central opening 36. The end face 47 is part of the top side 43 of the bottom base body part 13. The exterior region 34 of the bottom base body part 13 serves substantially for attachment of the cutting tool 14 to the receptacles 15 and for forming the pivot gap 28 between the top base body part 12 and the bottom base body part 13. In the preferred embodiment, the securing sleeve 35 of the bottom base body part 13 comprises a diameter e which is measured in radial direction in relation to the axis of rotation 17 and which is in particular at most 50% of the diameter d of the cutter head 10 that is measured in radial direction relative to the axis of rotation 17. In an alternative embodiment of the cutter head 10, a securing sleeve with a larger diameter e may be expedient. In the securing sleeve 35 of the bottom base body part 13, the screw element 19 is secured, in particular so as to be secured against rotation.

As illustrated in FIGS. 7, 8, 13, and 16, the cutter head 10 comprises a detachable snap-on connection 1. The snap-on connection 1 comprises at least one gripping hook 2 and at least one holding contour 4. The gripping hook 2 is preferably embodied so as to be bendable or flexible in a radial direction away from the axis of rotation 17. The at least one gripping hook 2 is formed at the top base body part 12 and extends into the central opening 36 of the top base body part 12. A hook head 3 is formed at the end of the gripping hook 2 which is facing the bottom base body part 13. The holding contour 4 is formed at the bottom base body part 13, in particular at the securing sleeve 35 of the bottom base body part 13. The snap-on connection 1 is embodied between the end faces 47, 50 of the base body part 12, 13 that are facing each other, i.e., the bottom side 31 of the top base body part 12 and the top side 43 of the bottom base body part 13. The gripping hooks 2 are arranged in a protected position in the cup-shaped central opening 36 of the top base body part 12.

When mounting the cutter head 10, the top base body part 12 and the bottom base body part 13 are pushed together in such a way that the gripping hook 2 is threaded into a holding opening 8 at the securing sleeve 35, and the gripping hook 2 and the holding contour 4 are engaged in an operative connection. In this context, the gripping hook 2 engages and locks in the holding contour 4. The gripping hook 2 with its hook head 3 engages from behind the holding contour 4 so that the snap-on connection 1 locks. The top base body part 12 and the bottom base body part 13 are connected to each other by means of the snap-on connection 1. The snap-on connection 1 exerts in the locked position a holding force between the top base body part 12 and the bottom base body part 13 which acts essentially in the direction of the axis of rotation 17.

In order to release the snap-on connection 1 again, the top base body part 12 and the bottom base body part 13 are to be pulled apart in the direction of the axis of rotation 17. In this context, only the holding force of the snap-on connection 1 must be overcome. The holding head (hook head) 3 comprises a contact surface 9 which generates the operative connection with the holding contour 4. The contact surface 9 is positioned at a slant in relation to the axis of rotation 17, i.e., in relation to the pulling direction of the top base body part 12 and of the bottom base body part 13. When the operator pulls apart the base body parts 12, 13 with a sufficient pulling force, the hook head 3 glides by means of its slanted contact surface 9 across the holding contour 4 so that the gripping hook 2 is pushed inwardly toward the axis of rotation 17. In doing so, the snap-on connection 1 and the base body parts 12, 13 are separated from each other.

Figure 7:
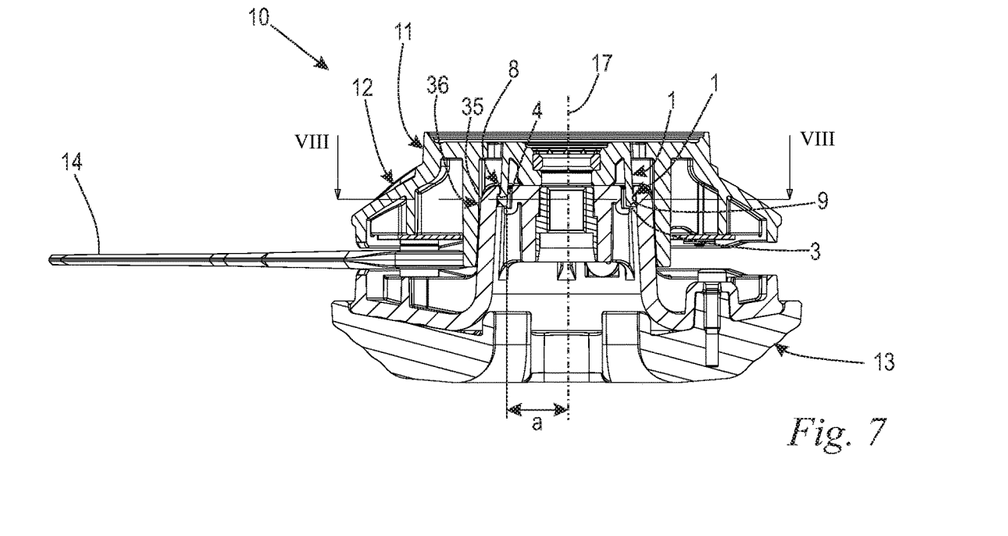
FIG. 7 shows a section illustration of the cutter head viewed in the direction of the arrows VII of FIG. 5.
Figure 8:
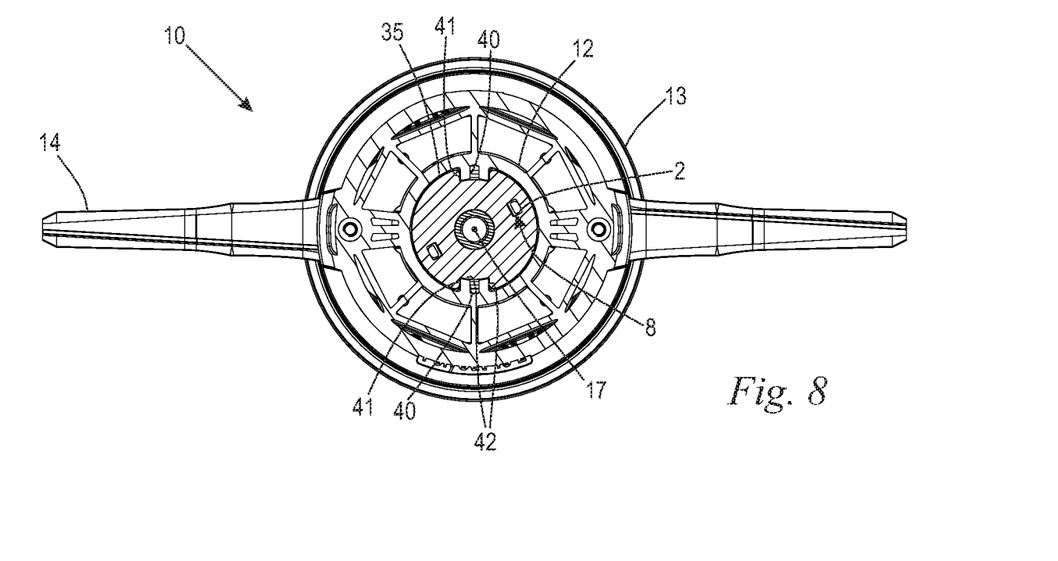
FIG. 8 shows a section illustration the cutter head viewed in the direction of the arrows VIII according to FIG. 7.

As illustrated in FIGS. 7 and 8, the snap-on connection 1 of the preferred embodiment comprises two gripping hooks 2 with corresponding holding contours 4. In an alternative embodiment, it can be expedient to provide also more than two (a plurality of) gripping hooks 2 with more than two (a plurality of) holding contours 4. When the snap-on connection 1 comprises a plurality of gripping hooks 2, they are distributed in circumferential direction about the axis of rotation 17 preferably at a uniform angle spacing. By use of a plurality of gripping hooks 2, the holding forces of the snap-on connection 1 can be increased. Alternatively, the contact surface 9 of the hook head 3 as well as the holding contour 4 in operative connection therewith can be adapted in order to adjust a holding force that is to be achieved.

The attachment of a cutter head 10 at a power tool is realized according to the following steps:

The operator turns the power tool 100 upside down such that the end of the output shaft 18 is pointing in a direction opposite to the direction of the force of gravity. Subsequently, the top base body part 12 is threaded onto the output shaft 18. Subsequently, the operator threads the cutting tools 14 onto the bearing bolts 16 which are screwed in at the top base body part 12. The operator pushes the bottom base body part 13 onto the top base body part 12 until the snap-on connection 1 locks. Subsequently, the entire cutter head 10 is screwed by means of the screw element 19 at the bottom base body part 13 onto the output shaft 18. Alternatively, the base body parts 12, 13 can be preassembled together with the cutting tools 14 and subsequently screwed onto the output shaft 18.

The snap-on connection 1 enables the operator to preassemble the base body parts 12, 13 with the cutting tool 14 and screw the assembly of cutter head 10 and cutting tool 14 together onto the output shaft 18 of the power tool 100. In this way, it is avoided that the operator loses individual components when attaching the cutter head 10. The assembly of the cutter head 10 is thus simplified.

Figure 9:
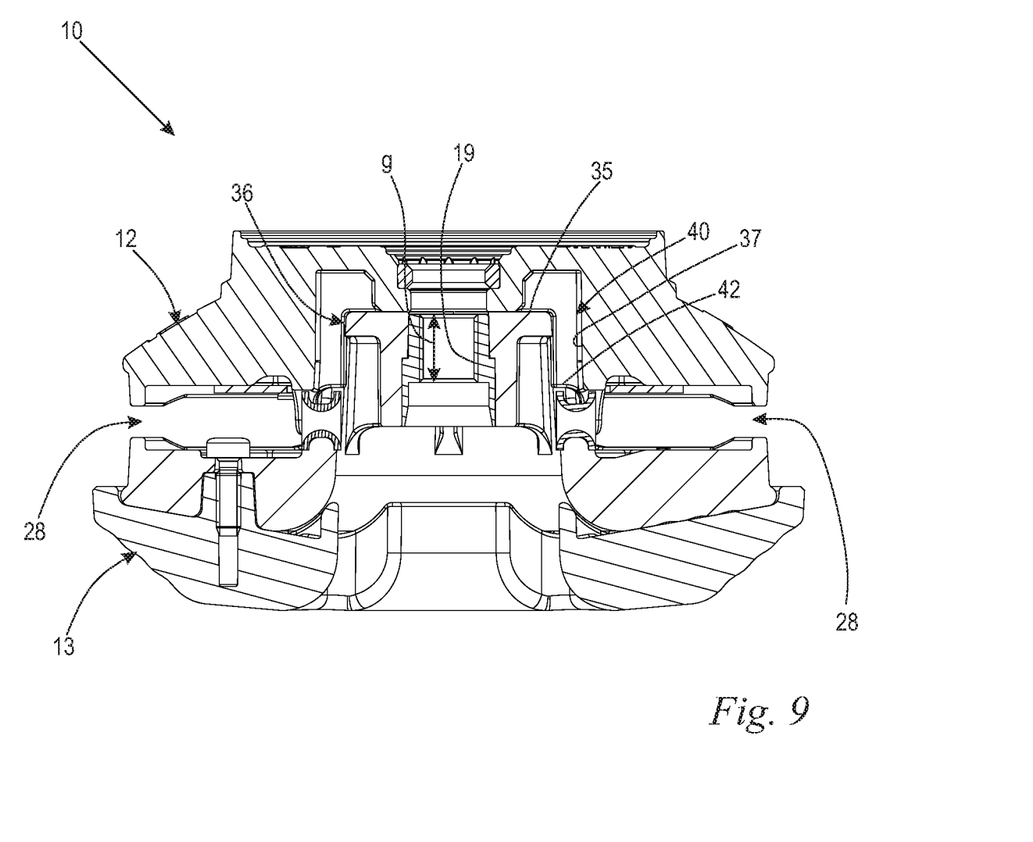
FIG. 9 shows in a section illustration the cutter head viewed in the direction of the arrows IX of FIG. 5.
Figure 11:
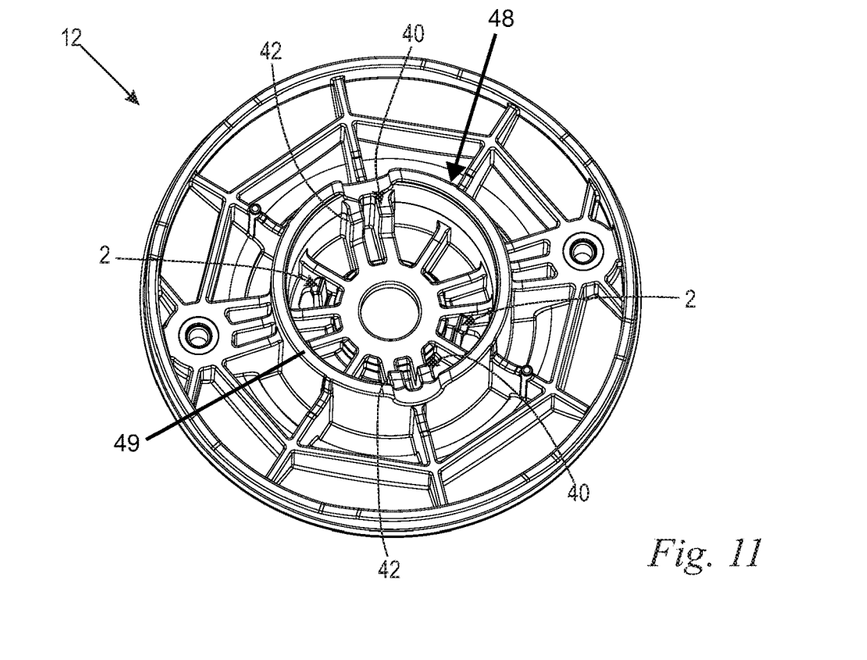
FIG. 11 shows in a perspective illustration the top base body part of the cutter head.

As illustrated in FIGS. 8 and 9, the cutter head 10 comprises a disruptive contour 40 and a guide groove 41. In the embodiment, the disruptive contour 40 is embodied at the top base body part 12. The guide groove 41, on the other hand, is embodied at the bottom base body part 13. In an alternative embodiment of the cutter head 10, the disruptive contour 40 can of course also be provided at the bottom base body part 13 and the guide groove 41 can be provided at the top base body part 12. As illustrated in particular in FIGS. 11 and 12, the disruptive contour 40 is formed at the inner wall 37 of the top base body part 12. The disruptive contour 40 is embodied as a rib 42 which is extending in axial direction, i.e., in the direction of the axis of rotation 17. In order to avoid material accumulations due to manufacturing technological reasons, a cutout is provided centrally at the rib 42. The ribs 42 project, beginning at the inner wall 37 of the top base body part 12, into the central opening 36. In the embodiment, two disruptive contours 40 are provided which have the same angle spacing relative to each other in circumferential direction relative to the axis of rotation 17.

Figure 14:
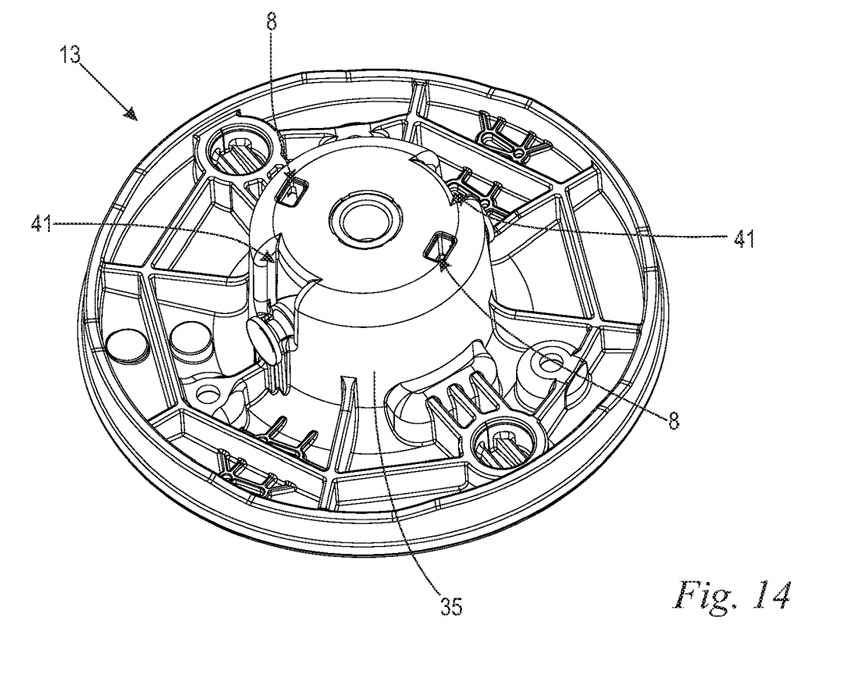
FIG. 14 shows in a perspective illustration the bottom base body part of the cutter head.
Figure 15:
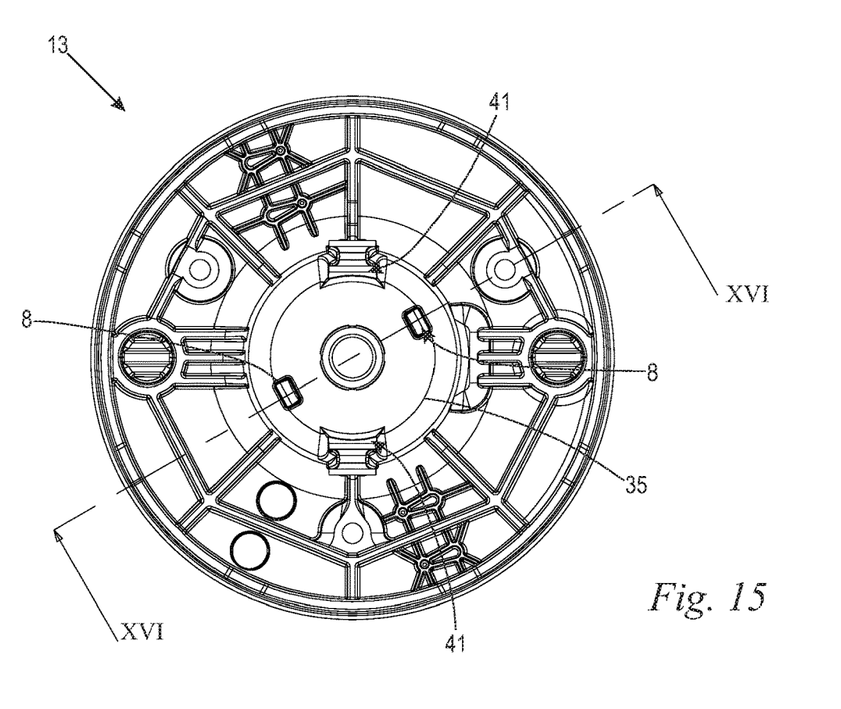
FIG. 15 shows in a top plan view the bottom base body part of the cutter head.
Figure 16:
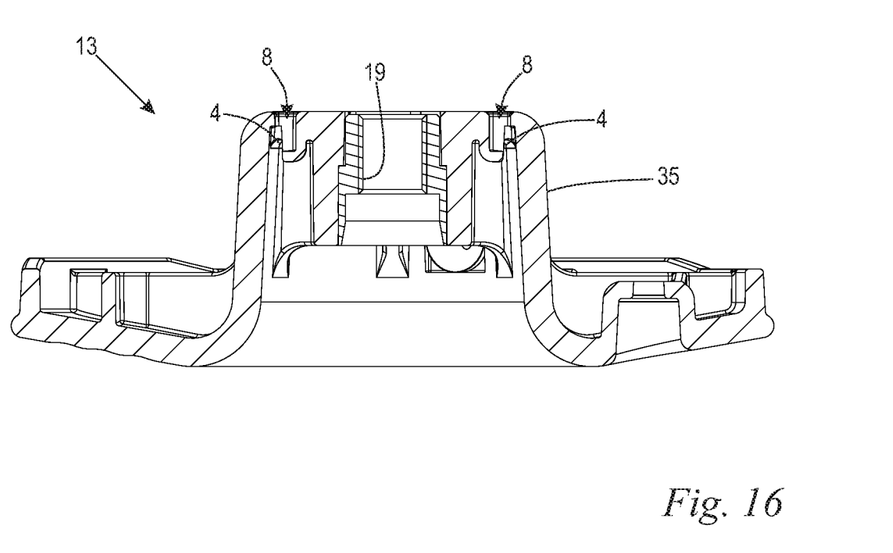
FIG. 16 shows in a section illustration the bottom base body part viewed in the direction of arrows XVI according to FIG. 15.

In FIGS. 14 and 15, the guide groove 41 is illustrated which is formed at the securing sleeve 35 of the bottom base body part 13. The guide groove 41 extends from the end face of the securing sleeve 35 in the direction of the axis of rotation 17 away from the end face of the securing sleeve 35. In the present embodiment, two guide grooves 41 are provided which, analog to the disruptive contours 40, are arranged at the same angle spacings in circumferential direction about the axis of rotation 17. The number of guide grooves 41 at the securing sleeve 35 corresponds in the embodiment to the number of disruptive contours 40 at the inner wall 37 of the top base body part 12. It can also be provided that fewer disruptive contours 40 than guide grooves 41 are present.

When mounting the cutter head 10, the interaction of disruptive contour 40 and guide groove 41 ensures that the top base body part 12 and the bottom base body part 13 can be assembled only in a predetermined position relative to each other. For assembly, the base body parts 12, 13 must therefore be aligned in circumferential direction relative to each other. In this context, the top base body part 12 with its disruptive contour 40 glides on the end face 47 of the securing sleeve 35 until the operator has aligned the base body parts 12, 13 by rotation relative to each other in such a way that the disruptive contour 40 and the guide groove 41 are positioned opposite each other in the direction of the axis of rotation 17. The top base body part 12 comprises a collar 48 which projects in axial direction past the disruptive element 40 and is provided with a collar end face 49; the collar 48 assists the user in radial alignment of the base member parts 12, 13 relative to each other during rotation. The disruptive contour 40 is configured in this context such that it can glide into the guide groove 41 and the base body parts 12, 13 can be pushed together.

The snap-on connection 1 as well as the disruptive contour 40 and the guide groove 41 are matched to each other in such a way that upon pushing together the base body parts 12, 13 first the disruptive contour 40 must glide into the guide groove 41 before the gripping hooks 2 can penetrate into the holding opening 8. Due to the disruptive contour 40 and the guide groove 41 contacting each other, torque between the base body parts 12, 13 can be transmitted in the circumferential direction relative to the axis of rotation 17. This has the result that the base body parts 12, 13 can no longer be rotated relative to each other already upon penetration of the gripping hooks 2 into the holding opening 8 at the securing sleeve 35. Due to the interaction of disruptive contour 40 and guide groove 41, the base body parts 12, 13 are connected to each other so as to be secured against rotation relative to each other. The disruptive contour 40 and the guide groove 41 form a form fit connection in the circumferential direction relative to the axis of rotation 17. In this way, an accidental rotation of the base body parts 12, 13 by the operator is prevented. In this way, breaking off of the gripping hooks 2 during mounting of the cutter head 10 can be prevented. The gripping hooks 2 of the snap-on connection 1 are protected during assembly by the disruptive contour 40 and the guide groove 41.

As shown in FIG. 9, the thread of the screw element 19 has a thread length g measured in the direction of the axis of rotation 17. The top base body part 12 comprises an axially measured total immersion depth h (FIG. 13) that corresponds to the distance between the collar end face 49 of the collar 48 and the end face 50 of the central opening 36. The disruptive contour 40 has an axially measured length i (FIG. 13) measured from the end face 50 of the central opening 36 to the end face of the disruptive contour 40. Moreover, the gripping hook 2 comprises an immersion depth j (FIG. 13) which extends, axially measured, from the end face 50 of the central opening 36 to the end of the hook head 3. The total immersion depth h is larger than the length i of the disruptive contour 40 so that, upon assembly of the base body parts 12, 13, the latter are first guided radially by means of the collar 48. The length i of the disruptive contour 40 is larger than the immersion depth j of the gripping hook 2 so that first the disruptive contour 40 and the guide groove 41 engage each other and only subsequently the gripping hook 2 engages the holding contour 4. The length i of the disruptive contour 40 amounts to at least 120%, in particular 150%, preferably approximately 200%, of the immersion depth j of the gripping hook 2. The disruptive contour j corresponds in this context preferably approximately to the thread length g of the screw element 19.

Figure 12:
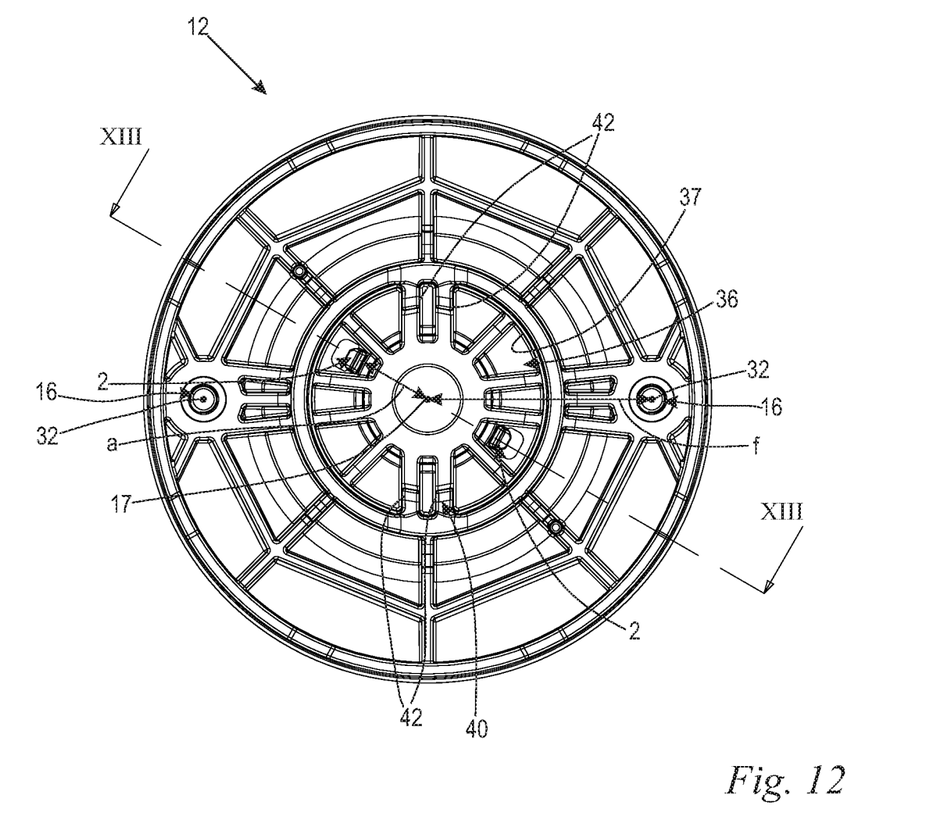
FIG. 12 shows in a view from below the top base body part of the cutter head.
Figure 13:
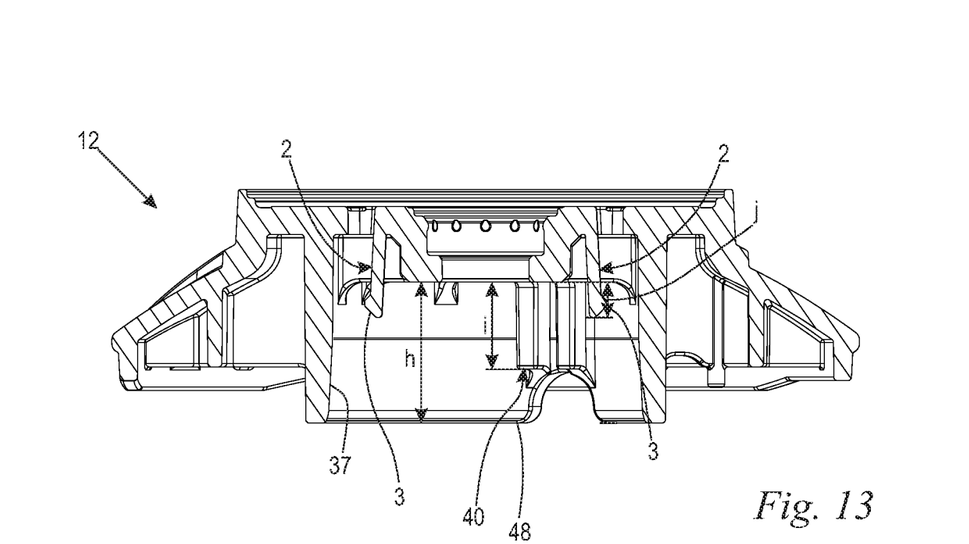
FIG. 13 shows in a section illustration the top base body part viewed in the direction of arrows XIII according to FIG. 12.

As illustrated in FIG. 12, the disruptive contours 40 are positioned at half the angle distance, here 90°, between neighboring bearing bolts 16. This is advantageous because the guide groove 41 forms a part of the trimmer line receptacle. The gripping hooks 2 are preferably centrally arranged between bearing bolts 16 neighboring each other and the disruptive contour 40. The gripping hooks 2, depending on the structure of the base body part 12, 13 and corresponding reinforcement ribs, can be arranged also off center between the bearing bolt 16 and the disruptive contour 40.

Figure 10:
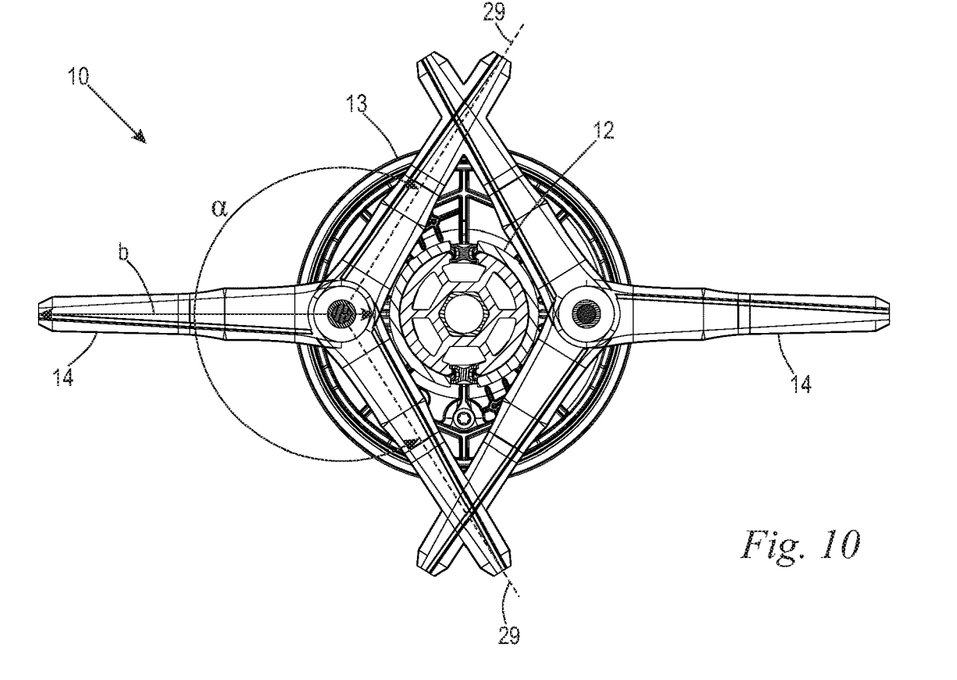
FIG. 10 shows a section illustration of the cutter head according to FIG. 2 in a view from above with outwardly pivoted cutting tools.

In FIG. 10, a section illustration of the cutter head 10 is illustrated in which the cutting tools 14 are maximally pivoted outwardly. The pivot angle α results from the two oppositely positioned pivot stops of the base body 11 for a corresponding cutting tool 14. In FIG. 10, the maximum pivot angle α of the cutting tool 14 is illustrated which is measured, beginning at the longitudinal axis 29 of the cutting tool 14, in the circumferential direction in relation to the bearing bolt 16. The pivot angle α amounts to preferably at least 60°, preferably at least 120°, in particular approximately 200°. The pivot plane of the cutting tool 14 is arranged perpendicularly to the axis of rotation 17. As illustrated in FIG. 7, the snap-on connection 1 is positioned at a distance a from the axis of rotation 17, which distance a is measured in radial direction in relation to the axis of rotation 17 and amounts to at most 40%, preferably at most 30%, in particular 25%, of the diameter d (FIG. 4) of the cutter head 10. The bearing axis 32 is positioned at a distance f (FIG. 12) from the axis of rotation 17. The distance f between the bearing axis 32 and the axis of rotation 17 is larger than the distance a between the snap-on connection 1 and the axis of rotation 17 (see FIG. 12). Accordingly, the snap-on connection 1 in radial direction relative to the axis of rotation 17 is positioned within the bearing axes 32 of the bearing bolts 16. Due to the configuration of the snap-on connection 1 near the axis of rotation 17, the components are moved into the interior region of the cutter head 10. In this way, the pivot gap 28 can remain correspondingly free and a larger pivot angle β can be enabled. In addition, the cutting tool 14 comprises a length b (FIG. 10) which is measured in its longitudinal direction wherein the length b amounts to at least 60% of the diameter d of the cutter head 10. In an alternative embodiment of the cutter head 10, the length b of the cutting knife 14 can also be designed shorter.

The specification incorporates by reference the entire disclosure of European priority document 20 180 105.7 having a filing date of Jun. 15, 2020.

While specific embodiments of the invention have been shown and described in detail to illustrate the inventive principles, it will be understood that the invention may be embodied otherwise without departing from such principles.

What is claimed is:

1. A cutter head for a brush cutter, the cutter head comprising:
   a base body comprising a top base body part and a bottom base body part, wherein the base body is configured to be rotatably driven in operation of the brush cutter about an axis of rotation of the base body;
   a screw element arranged at the bottom base body part, wherein the screw element is configured for attachment to an output shaft of the brush cutter;
   a receptacle configured to fasten a cutting tool, wherein the receptacle is arranged between the top base body part and the bottom base body part;
   wherein the top base body part and the bottom base body part are held at each other by a releasable snap-on connection;
   wherein the snap-on connection is positioned at a radial distance from the axis of rotation of the base body, wherein the radial distance is measured in a radial direction relative to the axis of rotation of the base body, wherein the distance amounts to at most 40% of a diameter of the cutter head;
   wherein the top base body part comprises a collar arranged in an interior of the top base body part, wherein the collar surrounds a central opening of the top base body part;
   wherein the bottom base body part comprises an interior region, wherein the interior region is a securing sleeve, wherein the securing sleeve is arranged in the central opening of the top base body part in a mounted state of the cutter head;
   wherein, in the mounted state of the cutter head, the snap-on connection is arranged in the central opening of the top base body part in a protected position enclosed by the securing sleeve of the bottom base body part.

2. The cutter head according to claim 1, wherein the radial distance amounts to at most 30% of the diameter of the cutter head.

3. The cutter head according to claim 2, wherein the receptacle comprises a bearing axis extending parallel to the axis of rotation of the base body, wherein the bearing axis is positioned at a distance from the axis of rotation of the base body, wherein the distance of the bearing axis from the axis of rotation of the base body is larger than the radial distance of the snap-on connection from the axis of rotation of the base body.

4. The cutter head according to claim 1, wherein the snap-on connection comprises one or more gripping hooks and one or more holding contours in operative connection with the one or more gripping hooks, respectively.

5. The cutter head according to claim 4, wherein the one or more gripping hooks are arranged at the top base body part and the one or more holding contours are arranged at the bottom base body part.

6. The cutter head according to claim 4, wherein the one or more gripping hooks each comprise a hook head configured to engage the one or more holding contours, respectively.

7. The cutter head according to claim 6, wherein the hook head is configured such that the snap-on connection is locked when pushing together the top base body part and the bottom base body part, and such that the snap-on connection is unlocked when pulling apart the top base body part and the bottom base body part.

8. The cutter head according to claim 4, wherein the central opening of the top base body part is a cup-shaped opening and wherein the one or more gripping hooks are arranged protected in the cup-shaped opening of the top base body part.

9. The cutter head according to claim 4, wherein the one or more gripping hooks are bendable or flexible in a radial direction away from the axis of rotation.

10. The cutter head according to claim 9, wherein the one or more gripping hooks each comprise a hook head with a slanted contact surface configured to contact the respective holding contour, wherein the slanted contact surface is positioned at a slant in relation to the axis of rotation, wherein, upon pulling apart the top base body part and the bottom base body part, the slanted contact surface of the hook head glides across the holding contour to disengage the hook head from the holding contour and to unlock the snap-on connection.

11. The cutter head according to claim 4, wherein the securing sleeve comprises a holding opening for each one of the one or more gripping hooks, wherein the one or more gripping hooks are threaded into the holding opening, respectively, when the top base body part and the bottom base body part are pushed together.

12. The cutter head according to claim 11, wherein the holding opening is arranged at an end face of the securing sleeve of the bottom base body part.

13. The cutter head according to claim 4, wherein the one or more holding contours are arranged at the securing sleeve of the bottom base body part.

14. The cutter head according to claim 1, further comprising a disruptive contour at one of the top base body part and the bottom base body part and further comprising a guide groove interacting with the disruptive contour and arranged at the other one of the top base body part and the bottom base body part, wherein the guide groove extends in a direction of the axis of rotation of the base body, wherein the disruptive contour and the guide groove are configured to align the top base body part and the bottom base body part to each other in a circumferential direction in relation to the axis of rotation of the base body.

15. The cutter head according to claim 14, wherein the snap-on connection is configured such that the snap-on connection locks only when the disruptive contour and the guide groove are aligned relative to each other.

16. The cutter head according to claim 14, wherein the disruptive contour and the guide groove are configured to transmit torque in the circumferential direction between the top base body part and the bottom base body part.

17. The cutter head according to claim 14, wherein the disruptive contour is formed at the collar.

18. The cutter head according to claim 14, wherein the guide groove is formed at the securing sleeve.

19. The cutter head according to claim 1, wherein the receptacle is a bearing bolt configured to arrange the cutting tool at the base body.

20. The cutter head according to claim 19, wherein the bearing bolt is fastened with one end at the top base body part or at the bottom base body part.

21. The cutter head according to claim 19, wherein the bearing bolt is fastened to the top base body part.

22. The cutter head according to claim 1, wherein the screw element is fixedly secured at the bottom base body part so as to prevent rotation relative to the bottom base body part.

23. The cutter head according to claim 1, wherein the receptacle is configured to pivotably support the cutting tool.

24. The cutter head according to claim 1, wherein the snap-on connection is formed between an end face of the top base body part and an end face of the bottom base body part, wherein the end face of the top base body part and the end face of the bottom base body part are facing each other, wherein the end face of the top base body part is a bottom side of the top base body part and the end face of the bottom base body part is a top side of the bottom base body part.

25. The cutter head according to claim 1, wherein the collar is an inner wall of the top base body part, wherein the inner wall extends in a direction of the axis of rotation of the base body.

26. A cutter head for a brush cutter, the cutter head comprising:
    a base body comprising a top base body part and a bottom base body part, wherein the base body is configured to be rotatably driven in operation of the brush cutter about an axis of rotation of the base body;
    a screw element arranged at the bottom base body part, wherein the screw element is configured for attachment to an output shaft of the brush cutter;
    a receptacle configured to fasten a cutting tool, wherein the receptacle is arranged between the top base body part and the bottom base body part;
    wherein the top base body part and the bottom base body part are held at each other by a releasable snap-on connection;
    wherein the snap-on connection is configured such that, for releasing the snap-on connection, the top base body part and the bottom base body part are to be pulled apart from each other solely by applying a pulling force;
    wherein the top base body part comprises a collar arranged in an interior of the top base body part, wherein the collar surrounds a central opening of the top base body part;
    wherein the bottom base body part comprises an interior region, wherein the interior region is a securing sleeve, wherein the securing sleeve is arranged in the central opening of the top base body part in a mounted state of the cutter head;
    wherein, in the mounted state of the cutter head, the snap-on connection is arranged in the central opening of the top base body part in a protected position enclosed by the securing sleeve of the bottom base body part.

* * * * *